(12) United States Patent
Heystek et al.

(10) Patent No.: US 7,582,378 B2
(45) Date of Patent: Sep. 1, 2009

(54) FUEL CELL SEAL AND PLATE FEATURES

(75) Inventors: Joseph J. Heystek, Fenton, MI (US); Ryan A. Vanderbilt, Ypsilanti, MI (US); Christian F Fau, Northville, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 833 days.

(21) Appl. No.: 11/171,731

(22) Filed: Jun. 30, 2005

(65) Prior Publication Data
US 2007/0003810 A1 Jan. 4, 2007

(51) Int. Cl.
H01M 2/08 (2006.01)
H01M 8/02 (2006.01)

(52) U.S. Cl. .......................................... 429/35; 429/38

(58) Field of Classification Search .................... 429/35, 429/38
See application file for complete search history.

(56) References Cited

U.S. PATENT DOCUMENTS

| | | | |
|---|---|---|---|
| 4,743,518 A * | 5/1988 | Romanowski | ............ 429/35 X |
| 5,671,927 A | 9/1997 | Schweiger | |
| 6,057,054 A | 5/2000 | Barton et al. | |
| 6,231,050 B1 | 5/2001 | Raden | |
| 6,350,538 B1 | 2/2002 | Wilkinson et al. | |
| 6,423,439 B1 | 7/2002 | Barton et al. | |
| 6,599,653 B1 * | 7/2003 | Cummins et al. | ............. 429/35 |
| 6,716,550 B1 | 4/2004 | Kirby et al. | |
| 7,070,876 B2 | 7/2006 | Artibise et al. | |
| 2003/0127806 A1 | 7/2003 | Belchuk | |
| 2004/0131916 A1 * | 7/2004 | Hodge et al. | ................... 429/35 |
| 2004/0191604 A1 | 9/2004 | Artibise et al. | |
| 2005/0089746 A1 | 4/2005 | James et al. | |

FOREIGN PATENT DOCUMENTS

WO WO 2004/061338 A1 7/2004

* cited by examiner

*Primary Examiner*—Stephen J. Kalafut
(74) *Attorney, Agent, or Firm*—Ronald W. Wangerow; Harness, Dickey & Pierce, P.L.C.

(57) ABSTRACT

In one aspect, a fuel cell assembly comprises a separator plate having a surface with a surface feature; and a seal comprising a resilient member defining a bead and a cooperating feature for engagement with the surface feature of the plate. The surface feature of the separator plate and the cooperating feature of the seal provide for engagement and preferably releasable engagement with one another during at least an assembly operation.

20 Claims, 9 Drawing Sheets

FUEL CELL SEAL AND PLATE FEATURES

FIELD OF THE INVENTION

The present invention relates in general to seals and more particularly to a seal employed for sealing between components in a fuel cell.

BACKGROUND OF THE INVENTION

A fuel cell is an electrochemical device that includes two electrodes at opposite surfaces of an electrolyte membrane. In one form, an ion-conducting polymer electrolyte membrane is disposed between two electrode layers. The electrode layers typically include gas diffusion media or gas diffusion layers (GDL). The catalyst coated membrane is often referred to as CCM. The CCM coupled with the GDL is often referred to as a membrane electrode assembly (MEA). The MEA is used to promote a desired electrochemical reaction from two reactants. One reactant, oxygen or air, passes over one electrode while hydrogen, the other reactant, passes over the other electrode. The oxygen and hydrogen combine to produce water, and in the process generate electricity and heat.

An individual cell within a fuel cell assembly includes an MEA placed between a pair of separator plates (also sometimes called flow field plates). The separator plates are typically fluid impermeable and electrically conductive. Fluid flow passages are typically formed in each plate surface and face the electrode layer to facilitate access of the reactants to the catalyzed active area of the electrodes. The flow passages also facilitate the removal of the products of the chemical reaction.

In such fuel cells, resilient gaskets or seals are typically provided between the faces of the MEA and the perimeter of each separator plate to prevent leakage of the fluid reactant and product streams. Since the fuel cell operates with oxygen and hydrogen, it is important to provide a seal that retains hydrogen, oxygen and water.

Thus, it is desirable to have a seal in a fuel cell that facilitates ease of assembly and alignment during an assembly operation while assuring the proper sealing for the finished assembly.

SUMMARY OF THE INVENTION

In one aspect, a fuel cell assembly comprises a separator plate having a surface with a surface feature; and a seal comprising a resilient member defining a bead and a cooperating feature for engagement with the surface feature of the plate. The surface feature of the separator plate and the cooperating feature of the seal provide for engagement and preferably releasable engagement with one another during at least an assembly operation.

Preferably, a membrane electrode assembly is disposed in electrically conductive contact with the plate; and the bead provides a seal between the membrane electrode assembly and the plate.

In another aspect, the fuel cell assembly comprises a membrane electrode assembly, including the first seal circumscribing a first gas diffusion region and a second seal circumscribing a second gas diffusion region. The first seal comprises a body of resilient material having an edge with an edge pattern. The second seal comprises a body of resilient material having an edge with an edge pattern. A first separator member, typically an electrically conductive separator plate, has a surface with a cooperating pattern for engagement with the edge pattern of the first seal. A second separator member has a cooperating pattern for engagement with the edge pattern of the second seal.

Preferably the membrane electrode assembly comprises a membrane, first and second catalyzed layers sandwiching the membrane, and respective first and second gas diffusion layers sandwiching the first and second catalyzed layers.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
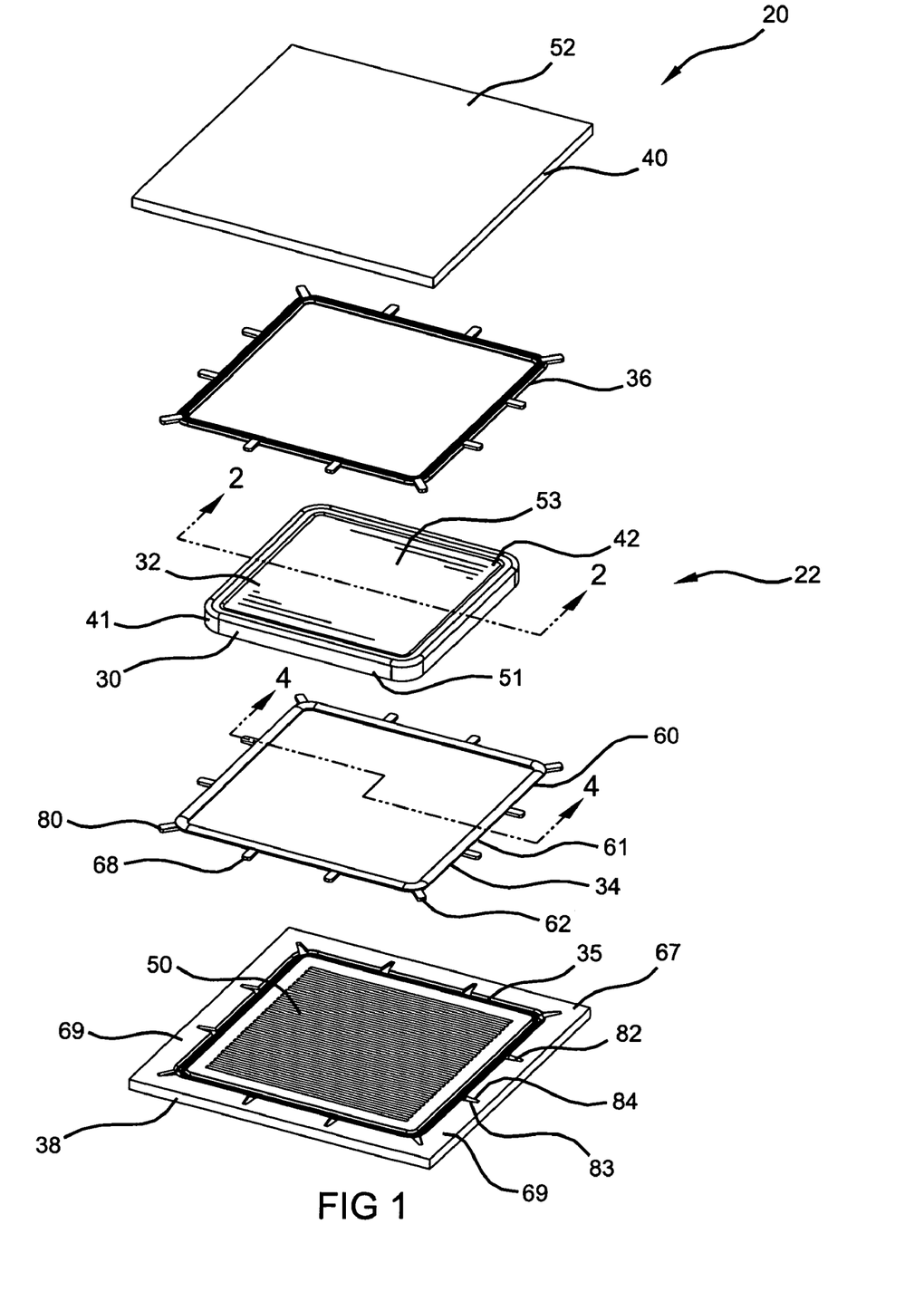
FIG. 1 is a schematic, exploded, perspective view of an individual cell for use in a fuel cell assembly or stack.
Figure 2A:
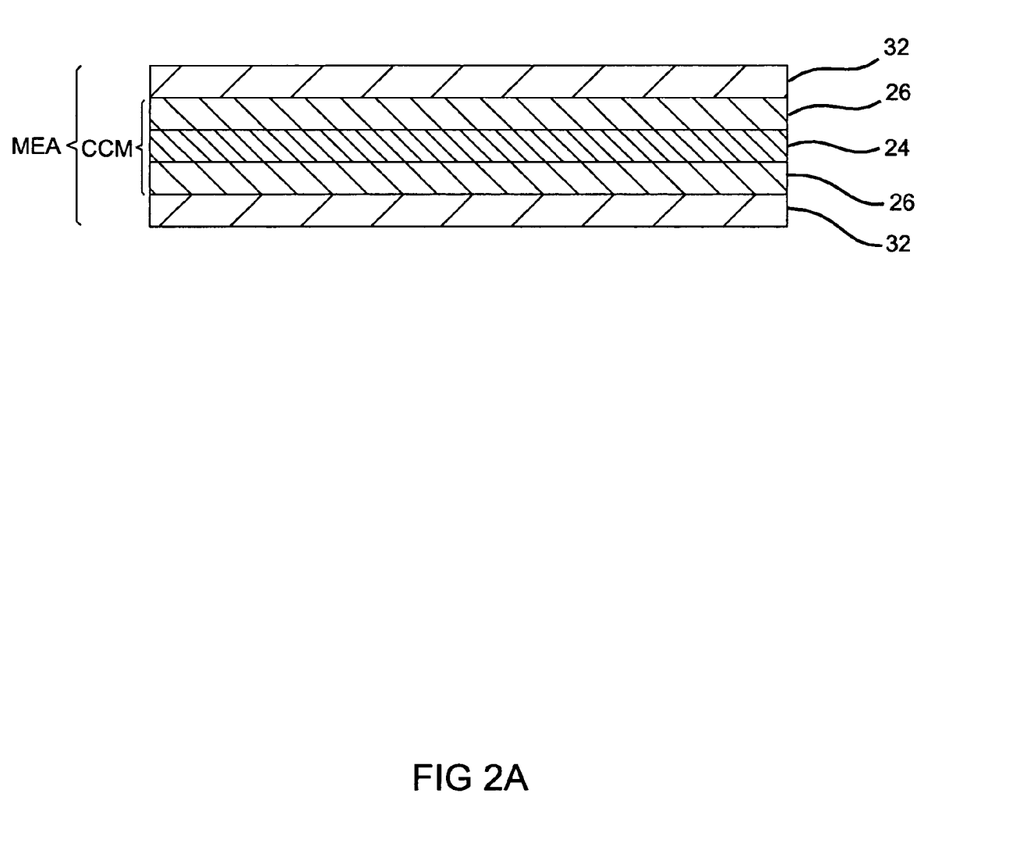
FIGS. 2A and 2B are sectional views of a membrane electrode assembly, taken along line 2-2 in FIG. 1.
Figure 2B:
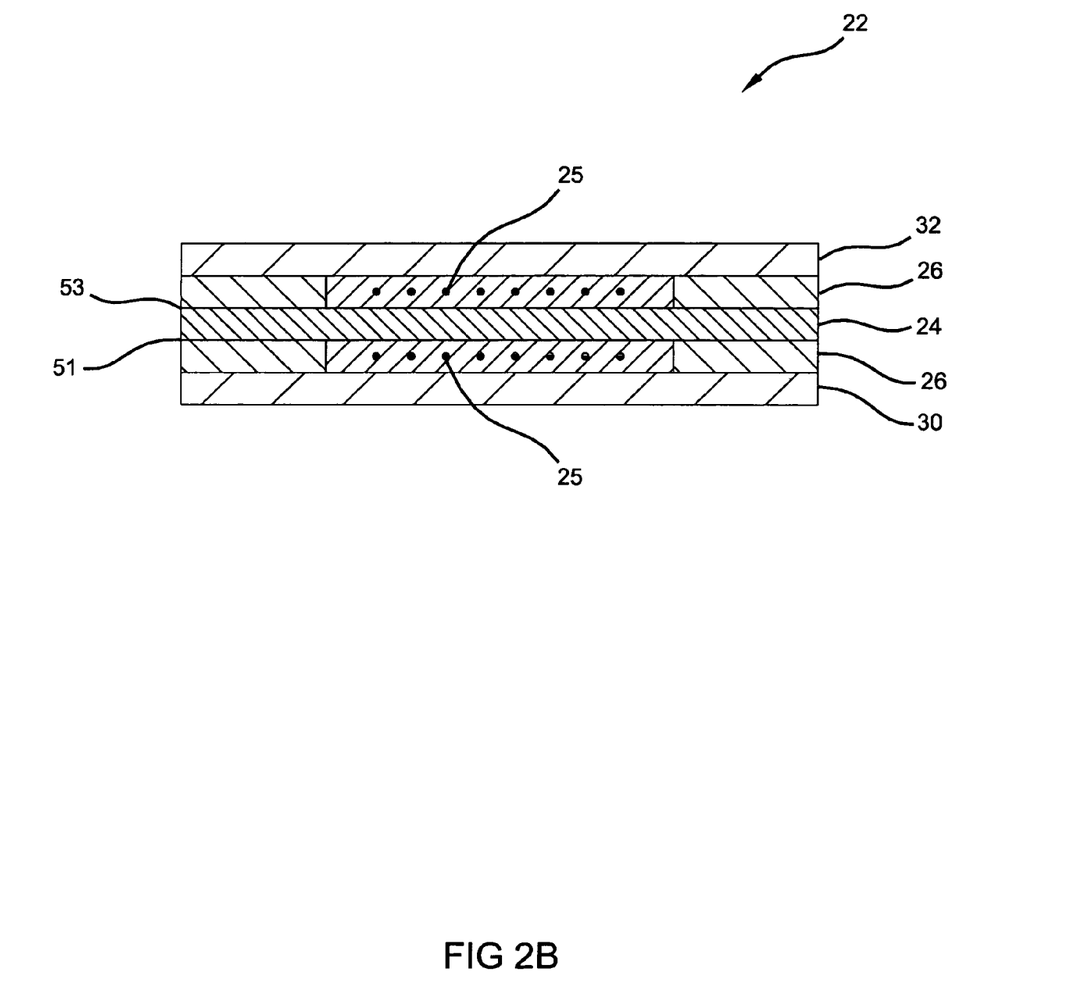

FIGS. 1, 2A and 2B illustrate an individual cell 20 for use in a fuel cell assembly. The individual cell 20 preferably includes seals 34, 36 encompassing or circumscribing a membrane electrode assembly (MEA) 22. The seals 34, 36 may be separate or formed as a unit with the CCM, the MEA and/or the GDL. The MEA 22 is made up of a membrane 24, with a layer containing catalyst material 26 on both sides of the membrane 24. The MEA 22 also includes a first gas diffusion layer (GDL) 30 and second GDL 32 on either side of the catalytic layers 26. A first seal 34 and a second seal 36 are arranged around the perimeters 41, 42 of the first GDL 30 and the second GDL 32, respectively. In some embodiments, the catalyst is essentially disposed in an inner region rather than across the entire face of the catalyst layer 26. FIG. 2B shows an embodiment where the seals circumscribe at least the catalytically active region 25 of the MEA. Preferably, the seals 34, 36 are secured to one or more of the CCM, the MEA or the GDLs 30, 32 by adhesive or molding, although other means of securing may be used if so desired.

Figure 3A:
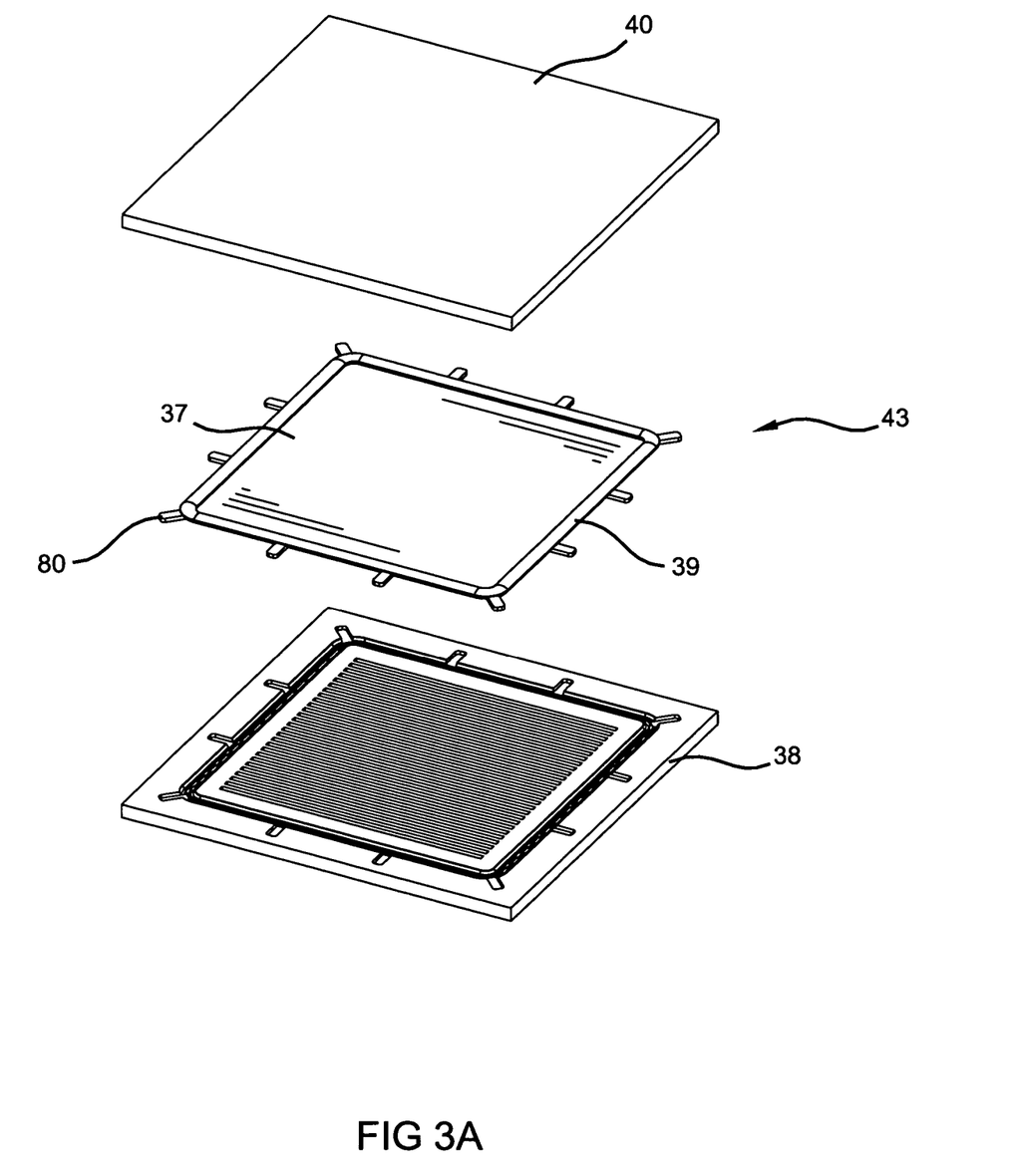
FIG. 3A is a schematic, exploded, perspective view of an MEA with a corresponding seal forming a unitized MEA seal assembly and separator plates associated therewith.
Figure 3B:
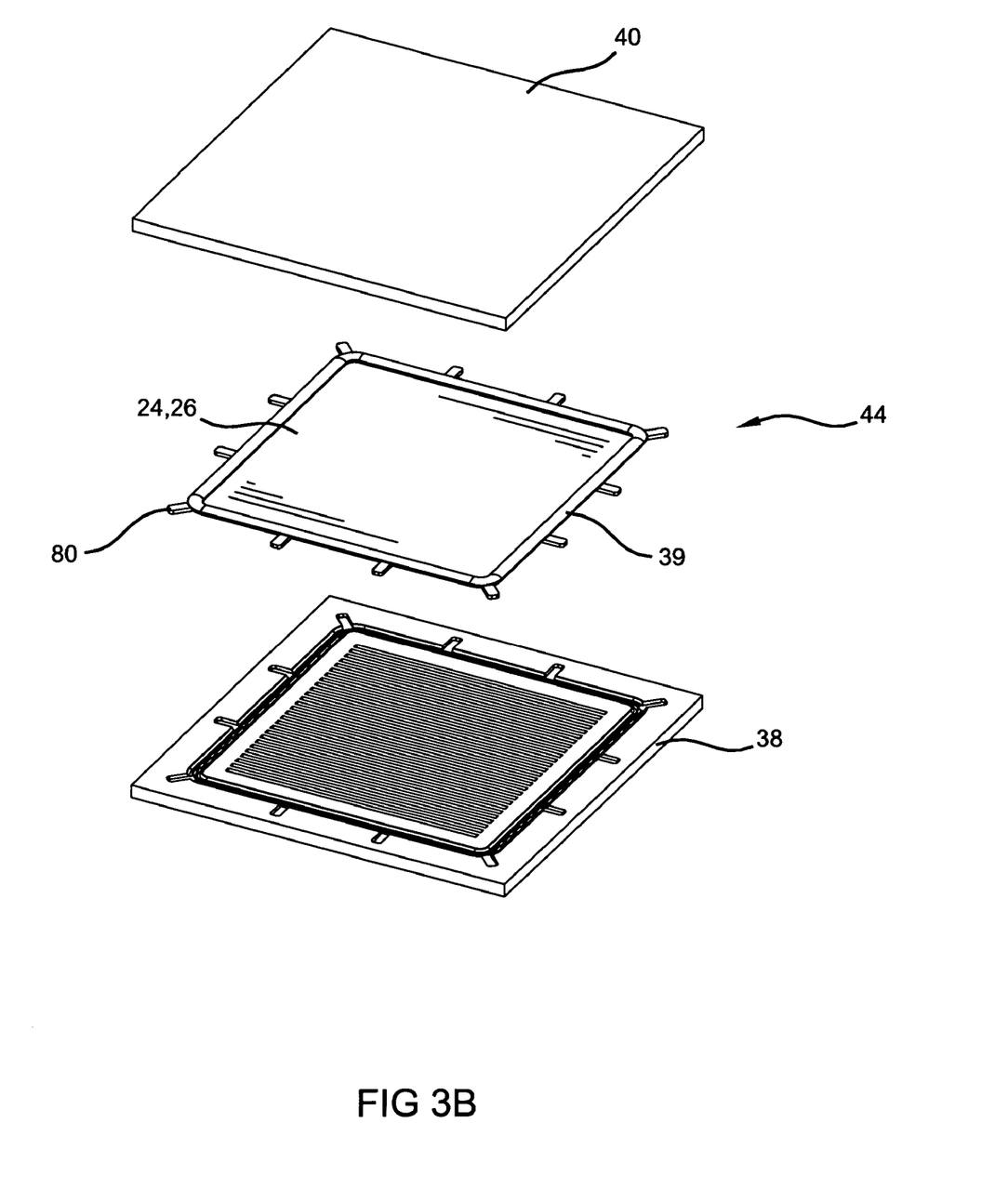
FIG. 3B shows a membrane having catalyzed layers and a corresponding seal forming a unitized unit and associated plates.

In one embodiment, an MEA 37 and a corresponding seal 39 forms a unitized MEA seal assembly 43 (FIG. 3A). In another embodiment, a membrane 24 having catalyzed layers 26 and a corresponding seal 39 forms a unitized assembly 44 (FIG. 3B).

The unitized seal 39 and/or the independent seals 34, 36 are preferably secured to the separator plates 38, 40 by means of interlocking patterns associated with the separator plates and the seals. In the case of two seals as in FIG. 1, a first separator plate 38 engages the first seal 34 and a second separator plate 40 engages the second seal 36 and the MEA is disposed between the plates and the cell 20 is sealed to prevent or at least inhibit migration of gases from the cell. In the case of the unitized seal 39, the patterns of plates 38, 40 engage with the patterned edge of the seal 39.

For ease of description, the seal 34 is described and represents the design of seals 36 and 39. In one aspect, the seal 34 comprises a body of resilient material having an edge 60 with an edge pattern 61. The separator plate 38 comprises a surface 67 having a cooperating pattern 69 for engagement with the edge pattern 61 of the seal 34. In one embodiment, the patterned edge 61 of the seal 34 may comprise raised portions 62 and the cooperating pattern 69 of the separator 38 comprises recessed portions 82, such as grooves. In another embodiment, the patterned edge 61 of the seal 34 comprises recessed portions 68 and the cooperating pattern of the separator 38 comprises raised portions 87. Any combination of raised and recessed portions, respectively, of the seal edge pattern 61 and of the separator member pattern 69 may be utilized. Further aspects of seal design are given below, following a description of other cell components.

The membrane 24 is preferably an ion-conducting, polymer, electrolyte membrane, as generally employed in this type of fuel cell application. The catalyst material is preferably platinum or other suitable catalyst material for a typical polymer electrode membrane type of fuel cell application. The ion-exchange membrane 24 is typically a polymer electrolyte membrane that conducts only positively charged ions. The membrane 24 prohibits the passage of electrons. Any suitable fuel cell membrane known in the art can be used. The membrane 24 typically includes a first major surface 51 and a second major surface 53. The first surface 51 faces an inner surface of the first gas diffusion layer 30 and the second surface 53 faces the inner surface of the second gas diffusion layer 32. Herein the term "major surface" is used to distinguish from side edge surfaces.

Thus, the membrane electrode assembly 22 includes catalyzed electrodes 26. Any of a number of catalysts known in the art may be used and are typically metal catalysts. Often, the catalysts are carried on conductive carbon particles. The polymeric electrolyte membrane 24 may be selected from a number of ion-conductive materials known in the art; an exemplary material is Nafion™.

The first and second GDLs 30, 32 are preferably a carbonized fiber, or may be another suitable gas permeable material for migration of gas to an electrode in a fuel cell. In accordance with the variations described herein, the MEA 22 can include a catalyzed membrane with GDLs assembled thereto, or a membrane assembled between two catalyzed GDLs, each of which is known to those skilled in the art.

The diffusion layers 30, 32 are generally porous. The diffusion layers 30, 32 can be made of a variety of materials known in the art, such as carbon fiber paper, which is generally comprised of a plurality of intertwined carbon fibers; conductive foam and the like. The desired features of the diffusion layers are that they be porous and electrically conductive.

Since the relative thicknesses of the various components are very thin, they are only depicted schematically in the figures in order to aid in describing the invention. The actual thicknesses of the components may vary according to the particular application of the fuel cell and are known to those skilled in the art. Also, the components of the cell 20 are generally symmetric about the membrane 24 or the MEA 22.

In some configurations, the membrane 24 is sized to extend laterally beyond the diffusion layers 30, 32. In other applications, the membrane 24 can be substantially coextensive with the first and second diffusion layers 30, 32 such that it terminates at side surfaces of the GDLs 30, 32. The membrane 24 can also be sized to terminate inboard of the side surfaces of the GDLs 30, 32. The description of the membrane 24 with respect to placement relative to the GDLs 30, 32 also pertains to an MEA 22 which comprises the membrane 24 which is catalyzed.

The first and second separator plates 38, 40, are generally rectangular in shape, although other shapes can also be employed if so desired. Each plate includes fluid flow passages 50 to facilitate access of the reactants to the electrodes (gas diffusion layers) and the removal of the products of the chemical reaction. The plates 38, 40, have outer surfaces 52 that are made to mate with adjoining individual cells in order to make up a completed fuel cell assembly.

It is preferred that each separator member 38, 40 has a channel 35 constructed and arranged to receive the respective seal 34, 36, 39. Preferably the respective seal circumscribes any one or more of the gas diffusion layer 30, 32; membrane 24 and MEA 22.

Figure 4:
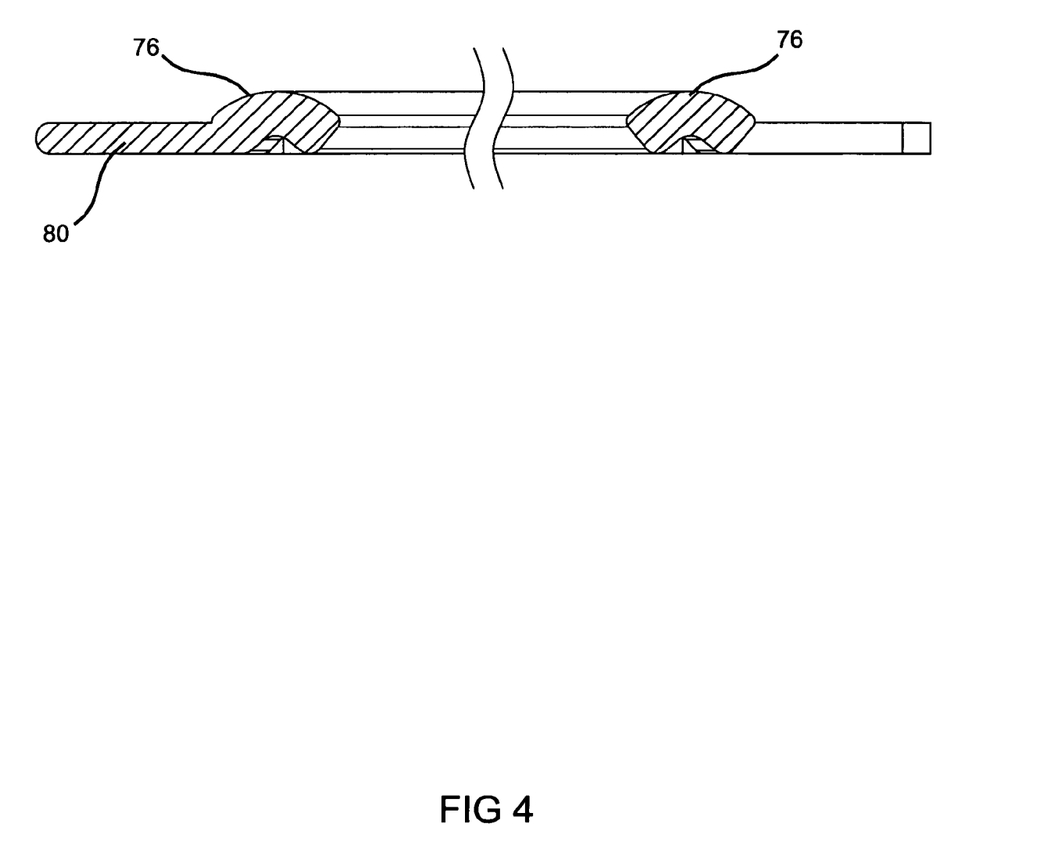
FIG. 4 is a partial, sectional view of a seal taken along line 4-4 in FIG. 1.

The seals 34, 36, 39 are each a body of thin, flexible, resilient material, preferably an elastomer material. (Detail shown in FIGS. 4, 6 and 7.) The seals preferably include a sealing bead 76 projecting therefrom. The sealing bead 76 abuts against the surface of its corresponding separator plate 38, 40 and is held with sufficient sealing force to prevent migration of fluid past the bead along the surface of the particular separator plate 38, 40. While the sealing bead 76 is showing an exemplary shape, different shapes may also be employed, if so desired. Also, the seals 34, 36, may be a single molded piece, or a multi-piece assembly.

As shown in the Figures, each of the seals 34, 36, 39 is disposed about the peripheral edge of the MEA 22. In various embodiments, the seal 34, 36, 39 is mounted to the outer surfaces of the GDLs 30, 32, the MEA 22, the membrane 24, or any combination thereof. In applications where the membrane 24 extends from beyond the first and second diffusion layers 30, 32, the seal is also mounted to and mounted over a portion of the membrane 24 that protrudes between the first and second diffusion layers 30, 32. Therefore, depending on the configuration, the seal applies a compression force to the membrane; the seal provides a compression force outboard of the MEA and provides a seal between two cooperating separator plates; and the seal may impregnate any portion of the MEA, and/or the diffusion layers.

As best shown in FIGS. 1, 4, 6 and 7, each seal 34, 36, 39 has a patterned side edge 60, and the detail of the design is given with reference to exemplary seal 34.

Preferably, the seal 34 comprises an elastomeric material and is most preferably at least one selected from the group consisting of silicone, fluorosilicone elastomer, fluorocarbon elastomer, ethylene propylene diene monomer elastomer, fluoroelastomers, thermoplastic elastomers, polyurethanes and perfluoroelastomers.

The edge pattern 61 of the seal 34 and the cooperating pattern 69 of the separator member 38 may be any of a variety of configurations that preferably provide releasable engagement where the engagement is at least sufficient to retain the seal in engagement with the separator member during an assembly operation. In this regard, the edge pattern may comprise protrusions (raised portions) or recesses (indented portions). Also contemplated are any of a variety of concave and convex pattern configurations.

In a preferred aspect, the edge pattern 61 of the seal 34 resilient member flexes for engagement with the cooperating pattern 69 of the separator member 38. In a still further preferred embodiment, the edge pattern 61 comprises tabs 80 which engage grooves 82 or recesses in the support member 38.

It is preferred that the tab 80 have at least one dimension which is greater than a dimension of the recess or groove 82 in the separator member 38, thereby the resilient material of the tab 80 is flexed for engagement with the smaller dimension of the recess or groove 82.

Figure 5:
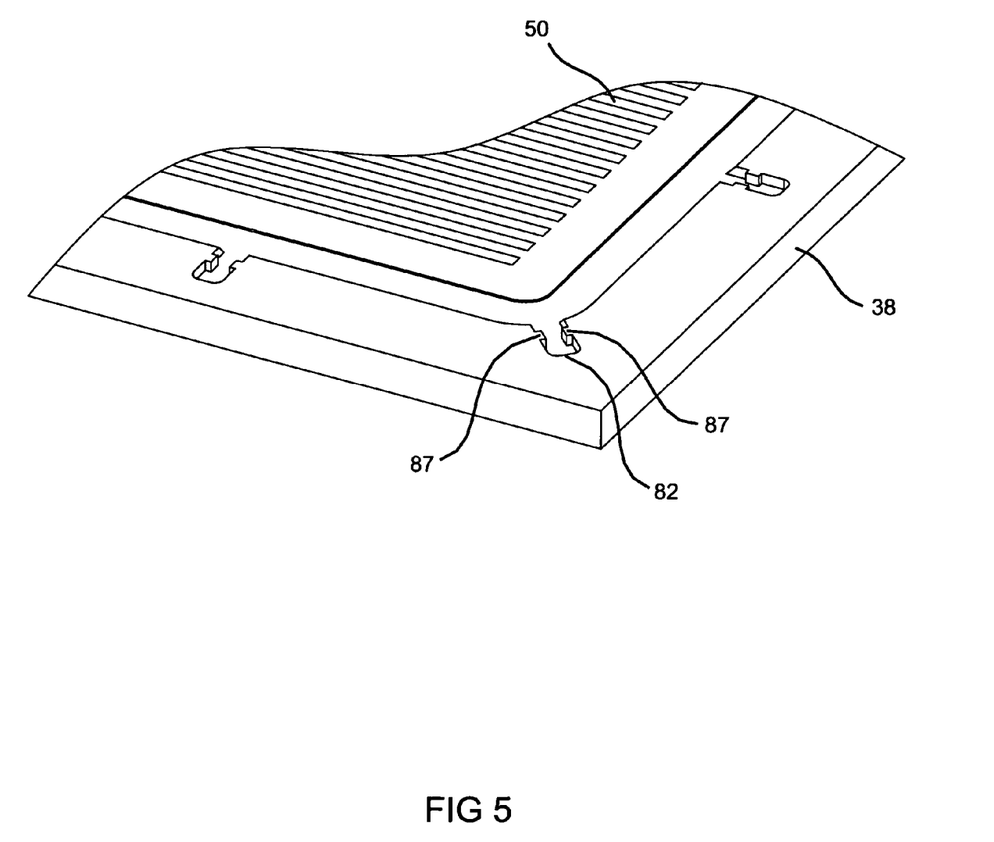
FIG. 5 shows detail of a separator member, including a notched recess.

Exemplary configurations of the groove 82 include converging sidewalls 83, 84 to provide the lesser dimension as compared to the tab, 80 such as a groove 82 having a notch or waist 87 providing a dimension less than that of the tab 80. (FIG. 5.)

Figure 6:
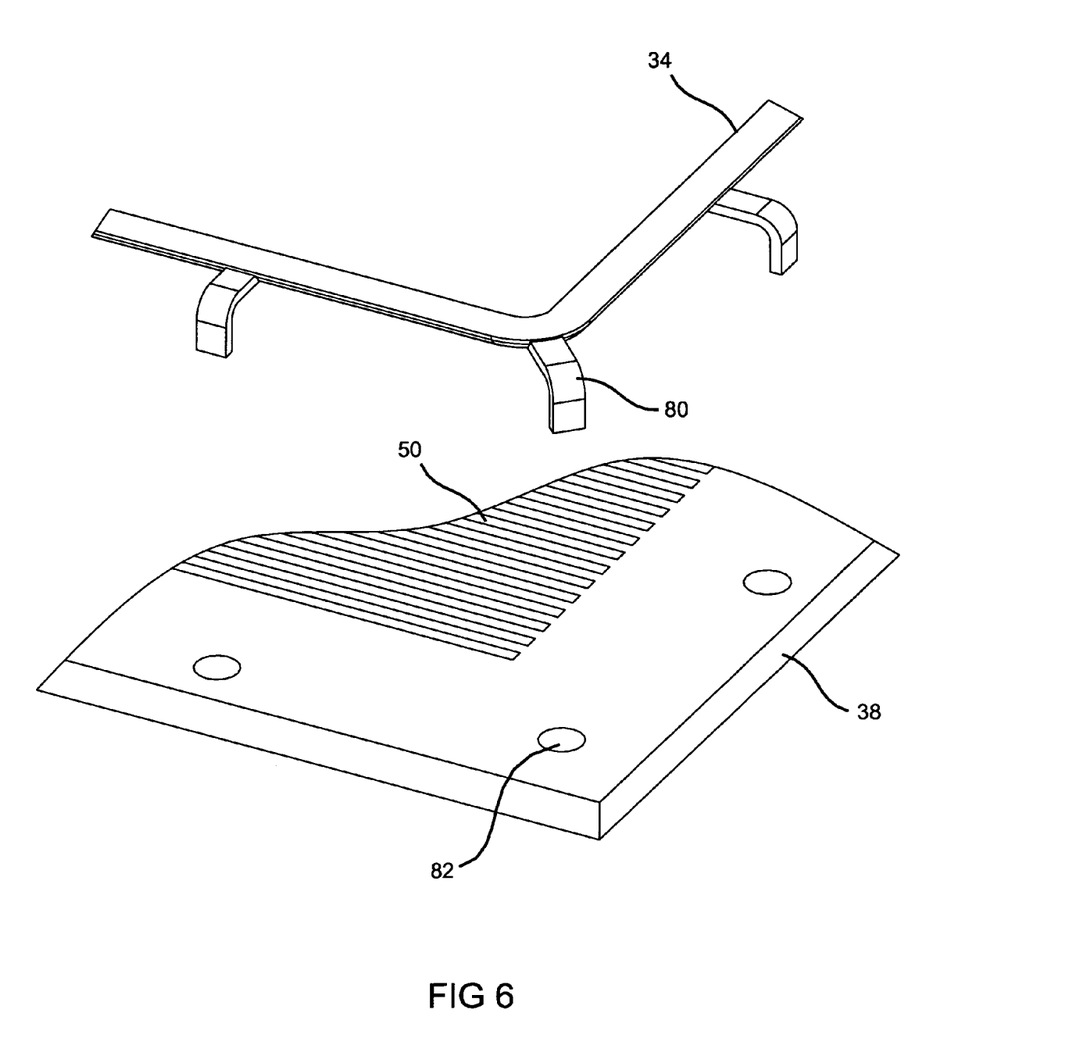
FIG. 6 shows configuration of a seal having a tab or engagement with a surface feature of a plate.

In still further embodiments, the tab 80 extends laterally from the edge of the seal 34 and is of sufficient length that it is flexed in a transverse direction for engagement with the separator member 38 at a groove 82 in the form of a hole. (FIG. 6.)

Figure 7:
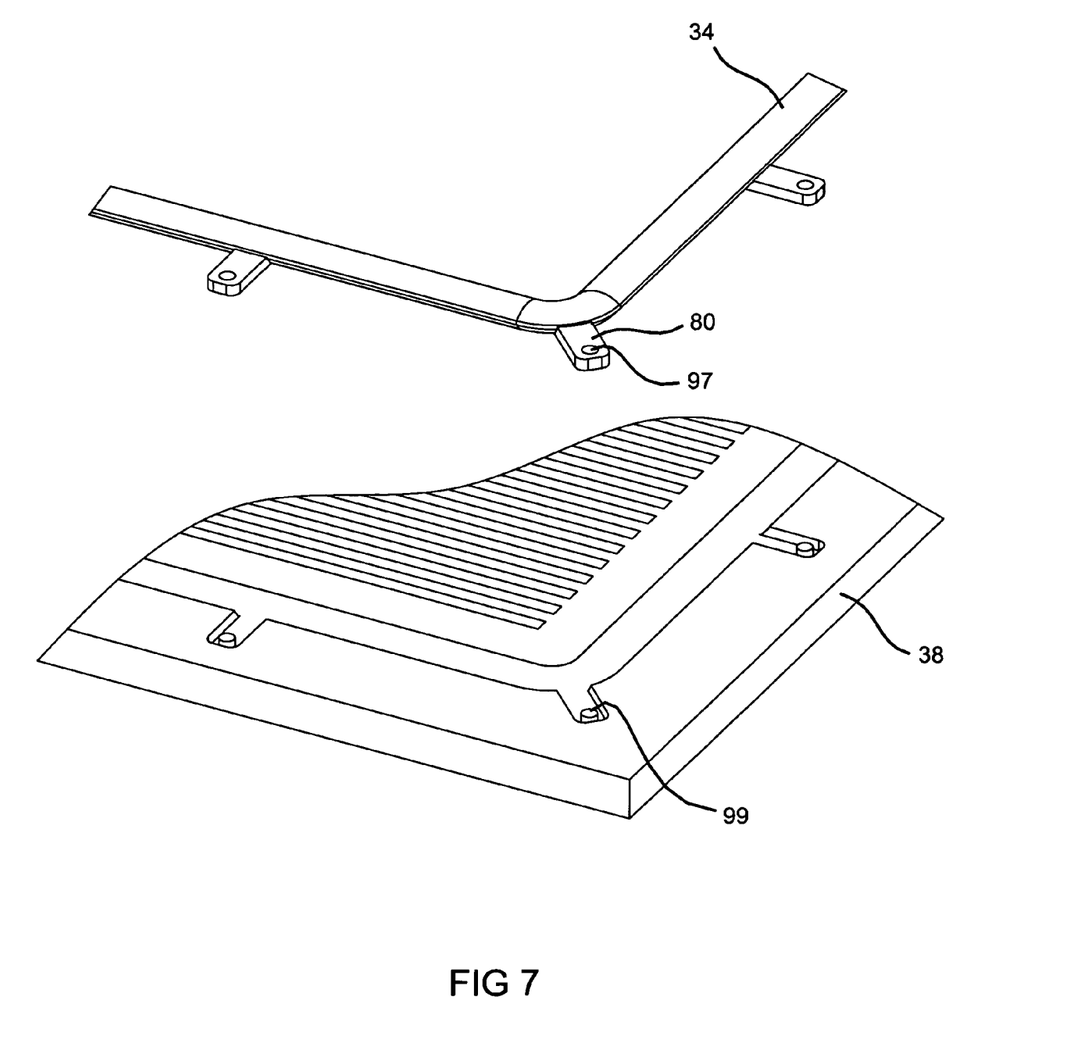
FIG. 7 shows a tab of the seal which includes a tab with an opening to engage with the surface feature of the separator plate.

In a still further variation, the tab 80 of the seal includes an opening 97 which engages with a surface feature of the separator member 38; for example, the tab 80 with the opening 97 engages a pin or notch 99 at the surface of the separator member 38. (FIG. 7.)

An exemplary process for manufacturing the fuel cell 20 will now be described in detail. To manufacture the MEA, the gas diffusion layers 30 and 32 are laminated to opposite sides of the catalyzed membrane 24 using any of a variety of devices and methods known in the art.

The diffusion layers 30 and 32 and the catalyzed membrane 24 are placed in a suitable mounting (not shown) to form a unit and install the one or more seals 34, 36, 39. The molding tool can also be used to laminate the diffusion layers 30, 32 to the membrane 24 as is known in the art. The molding tool can be any suitable molding tool that is commonly used in the art, such as an injection molding tool. The molding tool includes a mold with two halves that mirror the contour of the assembly being molded, namely, any one or more of the seals, the MEA and the diffusion layer.

The mold halves each include an annular recess and patterned area that extends about the perimeter of the mold and mirrors the areas to be formed. To form the seal, the elastomer is injected within the mold cavities formed by the recesses and pattern present in each mold half. The liquid elastomer flows within, or impregnates, the porous diffusion layers at the outboard regions.

At the time of molding, the seal beads are formed.

The elastomer is cured to solid state to form the seal. The portion of the elastomer impregnated within the diffusion layers essentially hardens to form a mechanical interlock between the seal and the diffusion layers. This mechanical interlock greatly enhances the sealing properties of the seal. The hardened seal in one embodiment also exerts pressure on the portion of the membrane that protrudes within the seal to increase the effectiveness of the seal about the membrane.

In the preferred method, the MEA having the integral seal is secured between support members to complete the fuel cell. The MEA is held in place along with the seal between support members by an external loading mechanism that is known in the art. Preferably the support member is a separator plate, preferably an electrically conductive plate, in a multiple cell configuration it is a bipolar plate, and it preferably contains flow field passages.

Multiple fuel cells are combined to form a fuel cell stack (not shown) as is known to those skilled in the art. In a fuel cell stack, the electrical output of each cell is combined to increase the voltage potential.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell component, comprising:
a seal having a body of resilient material with a patterned edge, and
a separator member comprising a surface having a cooperating pattern for engagement with said patterned edge of said seal,
wherein the cooperating pattern comprises one or more recesses and the patterned edge comprises a tab that has a dimension greater than the dimension of the recess.

2. The fuel cell component of claim 1, which further comprises an electrode facing a flow field disposed at the surface of the separator member, and the seal comprising a bead which retains gas within the flow field.

3. The fuel cell component of claim 1, which further comprises a membrane electrode assembly facing a flow field disposed at the surface of the separator member, and the seal comprising a bead which retains gas within the flow field.

4. The fuel cell component of claim 1, wherein the seal comprises an elastomeric material.

5. The fuel cell component of claim 4, wherein the elastomeric material comprises at least one selected from the group consisting of silicone, fluorosilicone elastomer, fluorocarbon elastomer, ethylene propylene diene monomer elastomer, fluoroelastomers, thermoplastic elastomers, polyurethanes and perfluoroelastomers.

6. The fuel cell component of claim 1, wherein the resilient material of the patterned edge flexes into engagement with the cooperating pattern of the separator member.

7. The fuel cell component of claim 1, wherein the resilient material of the patterned edge flexes into engagement with the one or more recesses of the separator member.

8. The fuel cell component of claim 2, wherein the seal is integral with the electrode.

9. The fuel cell component of claim 3, wherein the seal is integral with the membrane electrode assembly.

10. The fuel cell component of claim 1, wherein the patterned edge comprises one or more tabs which engage the cooperating pattern of the separator member.

11. The fuel cell component of claim 9, wherein the tabs extend laterally from the edge and flex in a transverse direction for engagement with the cooperative pattern of the current collector.

12. The fuel cell component of claim 1, wherein the body of resilient material includes a sealing bead disposed inboard of the edge pattern.

13. The fuel cell component of claim 1, wherein the separator member is electrically conductive.

14. The fuel cell component of claim 1, wherein the separator member is a bipolar plate.

15. The fuel cell component of claim 1, wherein the separator member is an electrically conductive gas distribution element.

16. A fuel cell component, comprising:
   a seal having a body of resilient material with a patterned edge, and
   a separator member comprising a surface having a cooperating pattern for engagement with said patterned edge of said seal,
   wherein the cooperating pattern comprises a groove and the patterned edge comprises a tab that has a dimension greater than the dimension of the groove.

17. The fuel cell component of claim 16, wherein the groove is contoured so that at least a portion of the groove defines a dimension less than a dimension of a portion of the tab.

18. The fuel cell component of claim 16, wherein the groove has converging sidewalls.

19. The fuel cell component of claim 16, wherein the groove has sidewalls which define a waist having a dimension less than the tab.

20. A fuel cell component, comprising:
   a seal having a body of resilient material with a patterned edge, and
   a separator member comprising a surface having a cooperating pattern for engagement with said patterned edge of said seal,
   wherein the cooperating pattern comprises one or more raised portions at the surface of said separator member for engagement with said seal, and
   wherein the patterned edge comprises a tab that extends from an edge of the resilient material, and the tab includes an opening which engages with said raised portion.

\* \* \* \* \*

UNITED STATES PATENT AND TRADEMARK OFFICE
CERTIFICATE OF CORRECTION

PATENT NO. : 7,582,378 B2 Page 1 of 1
APPLICATION NO. : 11/171731
DATED : September 1, 2009
INVENTOR(S) : Heystek et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1098 days.

Signed and Sealed this

Fourteenth Day of September, 2010

David J. Kappos
*Director of the United States Patent and Trademark Office*